US011713849B2

(12) United States Patent
Cho et al.

(10) Patent No.: US 11,713,849 B2
(45) Date of Patent: Aug. 1, 2023

(54) METHOD AND CONTROL UNIT FOR MONITORING A PRESSURE TANK SYSTEM

(71) Applicant: Bayerische Motoren Werke Aktiengesellschaft, Munich (DE)

(72) Inventors: Young-Jae Cho, Munich (DE); Jan-Mark Kunberger, Munich (DE); Georg Movsisyan, Munich (DE); Andreas Pelger, Ismaning (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 296 days.

(21) Appl. No.: 16/394,146

(22) Filed: Apr. 25, 2019

(65) Prior Publication Data
US 2019/0249830 A1 Aug. 15, 2019

Related U.S. Application Data

(63) Continuation of application No. PCT/EP2017/075943, filed on Oct. 11, 2017.

(30) Foreign Application Priority Data

Nov. 29, 2016 (DE) .................... 10 2016 223 693.8

(51) Int. Cl.
*F17C 13/02* (2006.01)
*B60K 15/03* (2006.01)

(52) U.S. Cl.
CPC ...... *F17C 13/025* (2013.01); *B60K 15/03006* (2013.01); *F17C 13/02* (2013.01);
(Continued)

(58) Field of Classification Search
CPC ...... F17C 13/025; F17C 13/02; F17C 13/026; F17C 2250/036; F17C 2250/0478;
(Continued)

(56) References Cited

U.S. PATENT DOCUMENTS

| 5,132,663 A | * | 7/1992 | Strobl | B60H 1/008 340/438 |
| 5,419,407 A | * | 5/1995 | Meyer | B60R 21/0136 180/274 |

(Continued)

FOREIGN PATENT DOCUMENTS

| DE | 10 2012 210 137 A1 | 12/2013 |
| DE | 10 2014 226 873 A1 | 12/2015 |

(Continued)

OTHER PUBLICATIONS

International Search Report (PCT/ISA/210) issued in PCT Application No. PCT/EP2017/075943 dated Feb. 23, 2018 with English translation (six (6) pages).

(Continued)

*Primary Examiner* — Jason K Niesz
(74) *Attorney, Agent, or Firm* — Crowell & Moring LLP

(57) ABSTRACT

A method monitors a pressure tank system of a stationary vehicle. The method detects a wake-up situation by use of sensor data of a main sensor of the vehicle. Furthermore, in reaction to the detection of a wake-up situation, the method activates a further resource for detecting and/or for evaluating sensor data with regard to the pressure tank system. Moreover, the method determines, by use of the further resource, whether one or more protective measures are to be carried out in relation to the pressure tank system and/or the surroundings thereof.

9 Claims, 1 Drawing Sheet

(52) U.S. Cl.
CPC .... *F17C 13/026* (2013.01); *B60K 2015/0321* (2013.01); *B60K 2015/03315* (2013.01); *F17C 2221/00* (2013.01); *F17C 2221/012* (2013.01); *F17C 2221/033* (2013.01); *F17C 2223/0115* (2013.01); *F17C 2223/0123* (2013.01); *F17C 2223/0153* (2013.01); *F17C 2250/03* (2013.01); *F17C 2250/036* (2013.01); *F17C 2250/043* (2013.01); *F17C 2250/0421* (2013.01); *F17C 2250/0439* (2013.01); *F17C 2250/0443* (2013.01); *F17C 2250/0478* (2013.01); *F17C 2250/0482* (2013.01); *F17C 2250/072* (2013.01); *F17C 2270/0168* (2013.01); *F17C 2270/0178* (2013.01); *Y02E 60/32* (2013.01)

(58) Field of Classification Search
CPC ...... F17C 2270/0178; F17C 2250/0482; F17C 2270/0168; F17C 2221/012; F17C 2223/0123; F17C 2250/03; F17C 2250/043; F17C 2250/0439; F17C 2250/0443; F17C 2250/072; B60K 15/03006; B60K 2015/0321; B60K 2015/03315
USPC .......................................................... 702/138
See application file for complete search history.

(56) References Cited

U.S. PATENT DOCUMENTS

| | | | | |
|---|---|---|---|---|
| 6,290,594 | B1 * | 9/2001 | Osborne | B60L 3/00 454/75 |
| 6,831,572 | B2 * | 12/2004 | Strumolo | B60Q 1/525 180/167 |
| 6,851,504 | B2 * | 2/2005 | Campbell | B60R 21/013 180/271 |
| 7,042,365 | B1 * | 5/2006 | Diaz-Lopez | G01V 1/008 340/521 |
| 7,077,741 | B2 * | 7/2006 | Brenner | B60L 3/00 454/75 |
| 7,125,040 | B2 * | 10/2006 | Link | B60R 21/0132 280/735 |
| 7,450,023 | B2 * | 11/2008 | Muralidharan | G08B 13/1663 340/539.1 |
| 7,539,569 | B2 * | 5/2009 | Baur | B60R 21/01 381/150 |
| 7,576,660 | B2 * | 8/2009 | Veenstra | F17C 13/025 340/632 |
| 8,627,841 | B2 * | 1/2014 | Hirakata | F17C 13/025 137/80 |
| 9,159,208 | B2 * | 10/2015 | Gritti | G08B 13/19695 |
| 9,787,951 | B2 * | 10/2017 | Kannon | G08G 1/168 |
| 9,802,565 | B2 * | 10/2017 | Nilsson | B60R 21/0134 |
| 9,849,852 | B1 * | 12/2017 | Larner | B60R 21/0134 |
| 10,086,786 | B2 * | 10/2018 | Lee | B60R 21/01512 |
| 10,207,583 | B2 * | 2/2019 | Dudar | F02D 41/26 |
| 10,929,928 | B2 * | 2/2021 | Bayley | B60R 21/0136 |
| 2006/0187009 | A1 * | 8/2006 | Kropinski | G01S 15/931 340/435 |
| 2007/0299587 | A1 * | 12/2007 | Breed | B60R 21/015 701/45 |
| 2008/0147267 | A1 * | 6/2008 | Plante | G07C 5/008 701/33.4 |
| 2010/0001851 | A1 * | 1/2010 | Handa | G01M 3/24 340/438 |
| 2014/0220469 | A1 | 8/2014 | Heise | |
| 2015/0028039 | A1 * | 1/2015 | Kircher | F17C 13/02 220/592.27 |
| 2015/0053274 | A1 | 2/2015 | Gordon | |
| 2015/0111542 | A1 * | 4/2015 | Cho | H04M 1/72457 455/411 |
| 2015/0219279 | A1 * | 8/2015 | Pelger | F17C 5/06 141/4 |
| 2016/0221518 | A1 | 8/2016 | McNicholas | |
| 2017/0233243 | A1 * | 8/2017 | McNicholas | B67D 7/0401 141/94 |

FOREIGN PATENT DOCUMENTS

EP          2 287 458 A2    2/2011
WO    WO 2010/146448 A1   12/2010

OTHER PUBLICATIONS

German-language Written Opinion (PCT/ISA/237) issued in PCT Application No. PCT/EP2017/075943 dated Feb. 23, 2018 (seven (7) pages).

German-language Search Report issued in counterpart German Application No. 10 2016 223 693.8 dated Sep. 27, 2017 with partial English translation (12 pages).

Rat der Europaeischen Union, Interinstitutionelles Dossier: 2013/0165 (COD) "Vorschlag fuer eine Verordnung des Europaeischen Parlaments und des Rates ueber Anforderungen fuer die Typgenehmigung zur Einfuehrung des bordeigenen eCall-Systems in Fahrzeuge und zur Aenderung der Richtlinie 2007/46/EG", 1635/14 LIMITE ENT 285 MI 967 CODEC 2411, Brussels, Dec. 10, 2014, thirty-seven (37) pages.

* cited by examiner

METHOD AND CONTROL UNIT FOR MONITORING A PRESSURE TANK SYSTEM

CROSS REFERENCE TO RELATED APPLICATIONS

This application is a continuation of PCT International Application No. PCT/EP2017/075943, filed Oct. 11, 2017, which claims priority under 35 U.S.C. § 119 from German Patent Application No. 10 2016 223 693.8, filed Nov. 29, 2016, the entire disclosures of which are herein expressly incorporated by reference.

BACKGROUND AND SUMMARY OF THE INVENTION

The invention relates to a method and to a corresponding control unit for monitoring a pressure tank system, in particular a hydrogen tank system, of a vehicle.

A road motor vehicle can have a fuel cell which supplies, on the basis of a fuel (e.g. hydrogen or compressed natural gas), electrical energy for operating, in particular for driving, the vehicle. The fuel (e.g. hydrogen in a state at ambient temperature, cryogenic state and/or liquid state or compressed natural gas) can be stored in a pressure tank system of the vehicle. The pressure tank system typically has a plurality of sensors with which the state of the pressure tank system can be monitored while the vehicle is operating. Through the monitoring of the pressure tank system it is possible, in particular, to avoid a situation in which hydrogen escapes from the pressure tank system in an uncontrolled manner.

The present document is concerned with the technical problem of monitoring the pressure tank system of the vehicle in an efficient and reliable way even in a stationary state, in particular in a parked state, of a vehicle.

According to one aspect, a method for monitoring a pressure tank system of a stationary, in particular of a parked, vehicle (in particular of a road motor vehicle) is described. The pressure tank system is configured to store a fuel (in particular hydrogen at ambient temperature, cryogenic hydrogen and/or liquid hydrogen) which can be used to drive the vehicle. The method can be executed by means of a control unit of the vehicle.

The method comprises detecting a wake-up situation via the sensor data of (at least) one basic sensor of the vehicle. The basic sensor can comprise a movement sensor (in particular an acceleration sensor) which is configured to detect a movement of the stationary, in particular of the parked, vehicle. An excessively large and/or excessively fast movement of the stationary, in particular of the parked, vehicle can be an indication that the stationary, in particular parked, vehicle has had a (rear end) collision and therefore the pressure tank system could possibly be damaged. It is therefore possible to detect on the basis of the sensor data of a movement sensor a wake-up situation which requires more extensive monitoring of the state of the pressure tank system. Furthermore, recording of the time when a wake-up situation occurs can be provided, with the result that on the basis of the time profile a more extensive analysis and activation of measures are made possible.

Alternatively or additionally, the basic sensor can comprise a sensor for measuring a heat flow in the surroundings of the pressure tank system and/or a sensor for measuring a temperature in the surroundings of the pressure tank system and/or a temperature in the pressure tank system. An excessively large generation of heat in the surroundings of the pressure tank system can be an indication of damage to the pressure tank system and therefore constitute a wake-up situation which requires more extensive monitoring of the state of the pressure tank system. In particular, substantial generation of heat in the surroundings of the pressure tank system can be an indication of a fire which could be caused by escaping fuel. Furthermore, substantial generation of heat in the surroundings of the pressure tank system can be an indication of a fire which could endanger the pressure tank system.

The detection of a wake-up situation can include comparing the sensor data of the basic sensor with a threshold value (e.g. with a movement threshold value, a speed threshold value, an acceleration threshold value, a heat flow threshold value, a pressure threshold value and/or a temperature threshold value). If the threshold value is exceeded, it can be determined that a wake-up situation is present. In particular it can be determined that a wake-up situation is present if the sensor data exceed the threshold value for a predefined minimum duration. It is therefore possible to detect a wake-up situation in a reliable way.

Alternatively or additionally, the detection of a wake-up situation can include detecting that another safety-related control device of the vehicle (e.g. an airbag control device or an automatic fire extinguishing system or an emergency call system) is activated. The basic sensor can then be configured to detect the waking up of another control device of the vehicle.

Alternatively or additionally, the detection of a wake-up situation can include detecting (e.g. by means of a wireless communication interface of the vehicle) that a critical state (e.g. a critical state of another vehicle) is present in the surroundings of the vehicle and/or detecting that an external triggering message for waking up is received at the vehicle by means of a wireless communication interface (e.g. from an emergency call center). The basic sensor can then be configured to receive and evaluate a triggering message relating to the critical state or relating to the external trigger. In other words, the basic sensor can be a sensor or an evaluation unit (e.g. a receiver in combination with an evaluation of received messages) for detecting a triggering message which has been emitted by a vehicle-external transmitter. The triggering message can indicate here that the vehicle is in a wake-up situation.

The method further comprises, in relation to the detection of a wake-up situation, activating at least one further resource for acquiring and/or evaluating sensor data relating to the pressure tank system. The activation of a further resource can comprise, in particular, activating at least one detail sensor for acquiring sensor data relating to the pressure tank system. Alternatively or additionally, computational resources (e.g. a control device of the pressure tank system and/or external computational resources, for example a backend server) for a more extensive evaluation of the sensor data of the at least one basic sensor and/or of the at least one detail sensor can be activated. The computational resources can be embodied as vehicle-external units, such as for example backend/cloud systems. By means of vehicle-external, centralized data management it is also possible to carry out a position-based evaluation which permits wake-up situations to be analyzed on the basis of environmental influences, even for a multiplicity of vehicles (the keyword here is "Big Data").

Exemplary detail sensors are: at least one sensor or a measuring unit for detecting a leak of the pressure tank system; at least one sensor for measuring a concentration of the fuel in the surroundings of the pressure tank system; at least one sensor for measuring a heat flow in the surroundings of the pressure tank system; at least one sensor for measuring a temperature in the surroundings of the pressure tank system; at least one sensor for measuring a temperature and/or a pressure in the pressure tank system and/or at least one sensor or a sensor system with a plurality of sensors for monitoring insulation of the pressure tank system. The state of the pressure tank system can be determined in a precise way by activating further resources.

The method further comprises determining, by way of the at least one further resource, whether one or more protective measures relating to the pressure tank system and/or the surroundings of the pressure tank system is to be carried out. In particular, a state of the pressure tank system and/or a state of the surroundings of the pressure tank system can be determined by the further resource. It is then possible (if necessary) to select and carry out one or more protective measures from a multiplicity of possible protective measures as a function of the determined state of the pressure tank system and/or as a function of the determined state of the surroundings of the pressure tank system. Exemplary protective measures are: outputting a message to a user of the vehicle; outputting an emergency call to an emergency call center; outputting data relating to the state of the pressure tank system to the fire service and/or acquiring image data relating to the surroundings of the vehicle and outputting the image data (to the user and/or to an emergency call center). In this context, stepped measures can optionally be carried out, with the result that a plurality of measures are executed sequentially depending on whether a pre-condition for a further measure is satisfied or not.

The method therefore permits energy-efficient and reliable monitoring of a pressure tank system of a stationary, in particular parked, vehicle.

According to a further aspect, a control unit for monitoring a pressure tank system of a stationary, in particular parked, vehicle is described. The control unit is configured to detect a wake-up situation by use of the sensor data of a basic sensor of the vehicle. Furthermore, the control unit is configured to activate, in reaction to the detection of a wake-up situation, at least one further resource for acquiring and/or evaluating sensor data relating to the pressure tank system. The further resource here can also comprise an externally present resource (e.g. a road camera or a camera of a vehicle which is parking in an adjacent position). The control unit is further configured to determine, by way of the at least one further resource, whether a protective measure relating to the pressure tank system is to be carried out.

According to a further aspect, a vehicle (in particular a road motor vehicle, e.g. a passenger car, a truck or a motor cycle), is described which comprises the control unit described in this document.

According to a further aspect, a software (SW) program is described. The SW program can be configured to be executed on a processor and thereby to execute the method described in this document. For power-saving execution, partial processes can be exported to one or more intelligent sensors with an integrated preprocessing unit. The one or more intelligent sensors can have an interrupt line to the main processor, wherein in the normal case the main processor is switched into a standby mode. In the case of a wake-up situation, the main processor can be woken up via the interrupt power, in order to be able to perform a detailed analysis of the situation. The SW program can therefore have a plurality of parts which are distributed over different components of a vehicle.

According to a further aspect, a storage medium is described. The storage medium can contain a SW program which is configured to be executed on a processor and thereby to execute the method described in this document. For the purpose of storage-saving execution, this may also comprise here an implementation as a ring memory, so that data which are no longer relevant can be overwritten on the basis of the chronological sensing of wake-up situations.

It is to be noted that the methods, devices and systems described in this document can be used, both alone and in combination with other methods, devices and systems described in this document. Furthermore, any aspects of the methods, devices and systems described in this document can be combined with one another in a variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
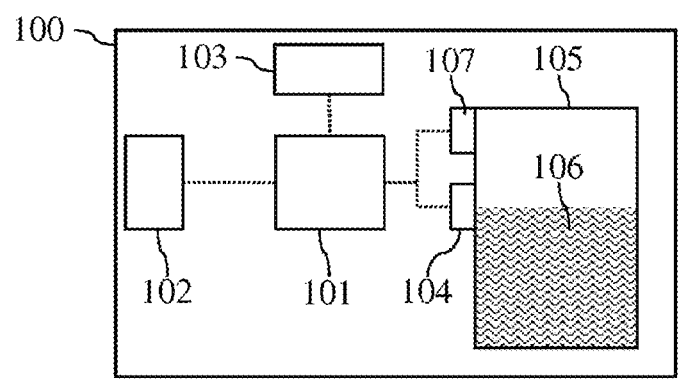
FIG. 1 is a block diagram of an exemplary vehicle having a pressure tank system.

As stated at the beginning, the present document is concerned with the reliable and energy-efficient monitoring of a pressure tank system of a stationary, in particular parked, vehicle. In this context, FIG. 1 shows a block diagram of a vehicle 100 with a pressure tank system 105 for storing a fuel 106 (e.g. for storing cryo-compressed hydrogen (CcH2), gaseous hydrogen (CGH2) or liquid hydrogen). The fuel 106 can be used to drive the vehicle 100. In particular, hydrogen 106 in a fuel cell can be converted into electrical energy for operating an electrical drive machine of the vehicle 100.

The vehicle 100 comprises a multiplicity of sensors 104, 107, for monitoring the pressure tank system 105. Exemplary sensors 104, 107 are:
(i) one or more sensors for measuring a leak of the pressure tank system 105, e.g. by measuring density differences, in particular with a temperature sensor and a pressure sensor;
(ii) a hydrogen sensor system for measuring a hydrogen concentration in the surroundings of the pressure tank system 105;
(iii) a sensor system for measuring a heat flow (e.g. by use of a thermoelectric generator);
(iv) a sensor system for measuring temperature;
(v) a sensor system (with one or more sensors and, if appropriate, evaluation logic) for monitoring insulation (e.g. for detecting a change in the internal energy in the pressure tank system 105 and/or for determining the vacuum pressure in the case of a CcH2 (cryo-compressed hydrogen) tank).

The state of the pressure tank system 105 can be reliably determined on the basis of the sensors 104, 107. In particular, it is possible to determine whether a state of the pressure tank system 105 is present which requires a protective measure to be carried out. An exemplary protective measure is e.g. the outputting of a message to a user of the vehicle 100 via a communication unit 103 of the vehicle 100, the dispatching of an emergency call to an emergency call center (e.g. to the fire service) via the communication unit 103, the outputting of data relating to the state of the pressure tank system 105 to an emergency call center via the communication unit 103, and/or the contacting of an online-enabled object in the surroundings of the vehicle 100 (e.g. to the fire extinguishing system of a multi-storey car park or to the emergency ventilation system of a tunnel, or to a traffic light circuit or to an indicator board or to a smartphone of a passer-by in order to warn the passer-by etc.). For example, an emergency call can automatically be dispatched as a function of the criticality of the determined state of the pressure tank system 105. Alternatively or additionally, a camera system of the vehicle 100 can be activated in order to acquire image data of the surroundings and/or of the vehicle 100 and transmit them via the communication unit 103.

In the parked state, the energized resources of a vehicle 100 are typically limited. In order thereby to permit reliable monitoring of a pressure tank system 105 of the vehicle 100, one or more basic sensors 102, 104 can be made available in the vehicle 100, which basic sensors 102, 104 are also active in the parked state of the vehicle 100 in order to check whether a wake-up situation is present which makes it necessary to activate a further sensor system 107 (in this document also referred to as one or more detail sensors 107) for determining the state of the pressure tank system 105.

The one or more basic sensors 102, 104 can comprise e.g. a movement sensor 102 (in particular an acceleration sensor) which is configured to detect a movement of the parked vehicle 100. For example, on the basis of the movement sensors 102 it is possible to determine whether the parked vehicle 100 has been bumped into or whether another vehicle has driven into the parked vehicle 100. A substantial movement (in particular a substantial acceleration) of the parked vehicle 100 can be evaluated as a wake-up situation which makes further checking of the state of the pressure tank system 105 necessary.

Alternatively or additionally, the one or more basic sensors 102, 104 can comprise one or more of the sensors for monitoring the state of the pressure tank system 105. For example, a temperature sensor and/or a heat flow sensor (if appropriate a plurality of sensors at different locations of the vehicle 100) can be used to detect substantial heating in the direct surroundings of the pressure tank system 105 as a wake-up situation. Alternatively or additionally, the fuel concentration in the direct surroundings of the pressure tank system 105 can be sensed by means of one or more fuel sensors and a wake-up situation can be detected when there is a raised fuel concentration.

A control unit 101 of the vehicle 100 can periodically evaluate the sensor data of the one or more basic sensors 102, 104 to determine whether a wake-up situation and/or a wake-up event is present. For example, on the basis of an acceleration sensor 102 it is periodically or continuously possible to determine acceleration values. Alternatively or additionally, temperatures, pressure (in particular tank pressure) and/or the heat flow at different vehicle locations and, if appropriate, the concentration of hydrogen can be determined. It can then be determined whether an applied or a permanently defined threshold value is exceeded. Furthermore, the duration for which values are exceeded can be measured. It can then be decided whether an event and, if appropriate, what type of event, has taken place (e.g. a simple bump during parking, a serious accident, etc.). In particular it is possible to determine whether or not a wake-up situation is present.

If it is determined that a wake-up situation is present, one or more detail sensors 107 and/or computational resources of the vehicle 100 can be activated. In particular, a control device of the pressure tank system 105 can be activated. On the basis of the sensor data of the one or more detail sensors 107 it is then possible to determine whether the pressure tank system 105 is in a state which makes it necessary to carry out a protective measure (e.g. whether there is damage to the pressure tank system 105). In particular, a protective measure can be carried out as a function of the sensor data of the one or more detail sensors 107.

The one or more detail sensors 107 can comprise e.g. a sensor system (in particular one or more sensors and/or evaluation logic) for measuring a leak and/or for monitoring insulation. Furthermore, the one or more detail sensors 107 can comprise a sensor system for measuring a fuel concentration, for measuring a heat flow, for measuring a tank pressure and/or for measuring a temperature.

Alternatively or additionally, additional resources for evaluating sensor data can be activated in reaction to the detection of a wake-up situation. In particular, plausibility checking of sensor data can be carried out (e.g. self-diagnostics of the sensors 102, 104, 107 for functional capability, coordination of the sensor data with the values when parking the vehicle 100, correction of sensor data (e.g. when changing the temperature) etc.).

The sensor system 102, 104, 107 of the vehicle 100 can be installed in an electric on-board power system of the vehicle 100 in such a way that, even when the parked vehicle 100 experiences an accident, a power supply to the sensor system 102, 104, 107 and/or the computational resources 101 is ensured. At least part of the sensor system 102, 104, 107 (in particular for measuring heat flow) can be supplied with power in an autonomous fashion by a thermoelectric generator.

If it is not possible to detect an event that requires the execution of a protective measure, the detail sensor system 107 and/or at least part of the control unit 101 can be deactivated or changed to a "sleep mode" (the power consumption of the electrical on-board power system of the vehicle 100 can therefore be reduced). The control unit 101 and/or the detail sensor system 107 can, if appropriate, be woken up again after permanently defined time periods, and monitoring can be started anew in order to detect possible thermodynamic and/or critical states of the pressure tank system 105.

Figure 2:
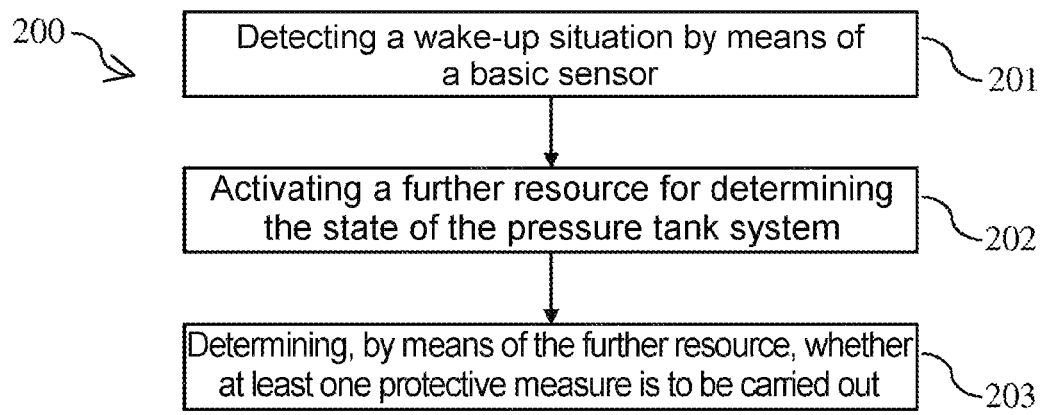
FIG. 2 is a flow chart of an exemplary method for monitoring a pressure tank system of a vehicle.

FIG. 2 shows a flow chart of an exemplary method 200 for monitoring a pressure tank system 105 of a parked vehicle 100. The pressure tank system 105 contains a fuel 106 which is used to drive the vehicle 100. The method 200 can be executed if it is detected that the vehicle 100 has been parked at a parked position and/or that the drive engine of the vehicle 100 has been deactivated. The method 200 can be executed e.g. by means of a control unit 101 of the vehicle 100.

The method 200 comprises detecting 201 a wake-up situation by way of sensor data of a basic sensor 102, 104 of the vehicle 100. The basic sensor 102, 104 can comprise, in particular, a movement sensor 102 (e.g. an accelerator sensor). For example, a wake-up situation can be detected if the sensor data of a movement sensor 102 of the vehicle 100 indicate that the parked vehicle 100 has been moved by more than a specific minimum distance, has moved at more than a specific minimum speed and/or has been accelerated by more than a specific minimum acceleration.

Furthermore, the method 200 comprises, in reaction to the detection 201 of a wake-up situation, the activation 202 of further resources 101, 107 for acquiring and/or evaluating sensor data relating to the pressure tank system 105. In particular, one or more detail sensors 107 can be activated in order to acquire (more extensive) sensor data relating to the state of the pressure tank system 107. Alternatively or additionally, further computational resources (e.g. further computational resources of the control unit 101 and/or a control device of the pressure tank system 105 and/or a vehicle-external resource) can be activated in order to perform a more extensive evaluation of sensor data. It is then possible to determine, by means of the further resources 101, 107 (step 203), whether at least one protective measure relating to the pressure tank system 105 is to be carried out or not. If appropriate, a specific protective measure can then be carried out.

Therefore, event-controlled monitoring of a thermodynamic tank system 105 of a vehicle 100 in a parked state is described. The described measures permit the detection and transmission of critical and safety-conditioned states, situations and/or events, as well as the transmission of information on the surroundings. This permits therefore improved estimation of situations and more rapid execution of protective measures relating to a pressure tank system 105 and its surroundings.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring a pressure tank system containing fuel of a road motor vehicle when the road motor vehicle is stationary, the method comprising the steps of:
    operating a movement sensor of the stationary road motor vehicle so as to generate first sensor data, wherein the movement sensor is configured to detect movement of the stationary road motor vehicle;
    detecting that a wake-up situation is present from the first sensor data;
    in response to the detecting that the wake-up situation is present, activating at least one device, so as to thereby acquire and/or evaluate second sensor data relating to the pressure tank system, wherein the at least one device is not activated for acquiring and/or evaluating second sensor data relating to the pressure tank system prior to the wake-up situation being present; and
    determining, by way of the device, whether one or more protective measures relating to the pressure tank system and/or surroundings of the pressure tank system are to be carried out.

2. The method as claimed in claim 1, further comprising the step of:
    activating computational resources for a more extensive evaluation of the first sensor data of the movement sensor.

3. The method as claimed in claim 1, wherein the protective measures comprise one or more of:
    (i) outputting a message to a user of the vehicle;
    (ii) outputting data relating to a state of the pressure tank system;
    (iii) outputting an emergency call to an emergency call center; and
    (iv) taking up contact with at least one security device in the surroundings of the vehicle.

4. The method as claimed in claim 1, further comprising the steps of:
    determining, by the device, a state of the pressure tank system and/or a state of the surroundings of the pressure tank system; and
    selecting the one or more protective measures from a multiplicity of possible protective measures as a function of the state of the pressure tank system and/or the state of the surroundings of the pressure tank system.

5. The method as claimed in claim 1, wherein the fuel comprises:
    a pressurized fuel;
    compressed natural gas; and/or
    cryo-compressed hydrogen, hydrogen at ambient temperature or liquid hydrogen.

6. The method as claimed in claim 1, wherein the detection of a wake-up situation comprises:
    comparing the first sensor data of the movement sensor with a threshold value; and/or
    determining that the wake-up situation is present when the first sensor data exceed the threshold value for a predefined minimum duration.

7. The method as claimed in claim 1, wherein the activation of the at least one device comprises:
    activating at least one detail sensor to acquire the second sensor data relating to the pressure tank system.

8. The method as claimed in claim 7, wherein the at least one detail sensor comprises one or more of:
    (i) at least one sensor for measuring a concentration of the fuel in the surroundings of the pressure tank system; and
    (ii) at least one sensor for measuring a temperature and/or a pressure in the pressure tank system.

9. A system for monitoring a pressure tank system of a road motor vehicle when the road motor vehicle is stationary, comprising:
    a movement sensor of the stationary road motor vehicle, wherein the movement sensor is operable to generate first sensor data, and wherein the movement sensor is configured to detect movement of the stationary road motor vehicle;
    a device configured to acquire and/or evaluate second sensor data relating to the pressure tank system; and
    a control unit configured to:
        detect that a wake-up situation is present from the first sensor data;
        activate the device in response to detecting that the wake-up situation is present, so as to acquire and/or evaluate the second sensor data, wherein the is not activated for acquiring and/or evaluating second sensor data relating to the pressure tank system prior to the wake-up situation being present; and
        determine, via the device, whether one or more protective measures relating to the pressure tank system and/or surroundings of the pressure tank system are to be carried out.

* * * * *